April 11, 1939.  L. GOLDHAMMER  2,153,665
ROLL FILM CAMERA
Filed Aug. 28, 1937
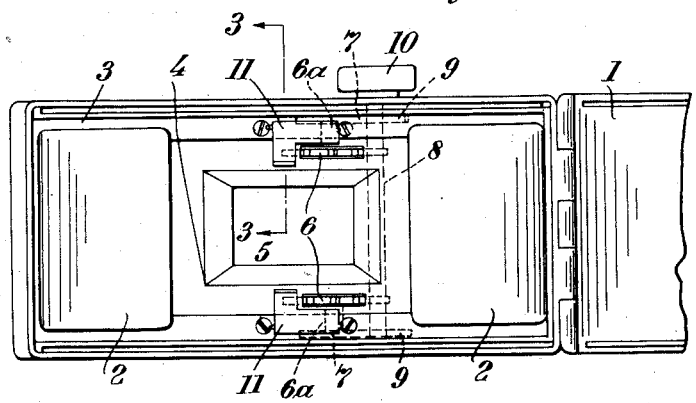
*Fig.1*
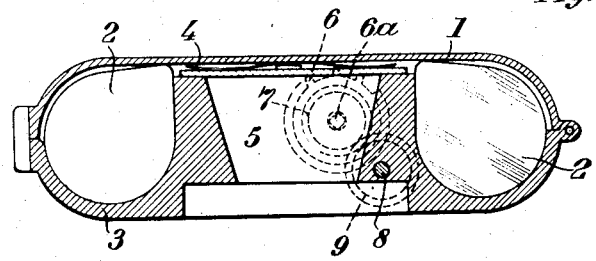
*Fig.2*
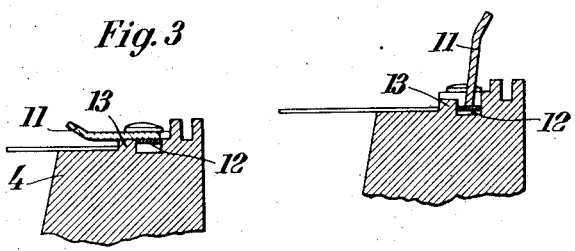
*Fig.3*  *Fig.4*
Inventor
Leo Goldhammer
By Attorney Patented Apr. 11, 1939

2,153,665

UNITED STATES PATENT OFFICE 2,153,665

ROLL FILM CAMERA

Leo Goldhammer, Munich, Germany, assignor to Agfa Ansco Corporation, Binghamton, N. Y., a corporation of New York Application August 28, 1937, Serial No. 161,488
In Germany September 5, 1935

2 Claims. (Cl. 95—31)

This invention relates to roll film cameras.

One of its objects is to provide an improved film feed for perforated films in roll film cameras. Further objects will be seen from the following detailed specification.

Reference is made to the accompanying drawing in which

Figure 1 shows a rear view of the opened camera;

Figure 2 shows a cross section through the closed camera into which the film holder has been inserted;

Figure 3 shows a part section on line 3—3 of Figure 1, and

Figure 4 is a section showing in raised position the lever arm for holding down the film.

In the small cameras hitherto known for films which are preferably of 35 mm. width the feed roller for the film has been arranged in a housing between the dark chamber and the spool chamber. The arrangement has the disadvantage that the camera must be of comparatively large dimensions. Moreover, there has to be a certain amount of guiding of the film because of the considerable distance of the winding-up chamber from the unwinding chamber.

For the purpose of avoiding these disadvantages this invention arranges toothed wheels, for feeding the perforated film, on both sides of the picture window nearby the narrow side walls of the camera and the dark chamber. These toothed wheels have short axles which are in gear with a guiding axle journalled between the winding-up chamber and the unwinding chamber and extending through the wall. By this arrangement of a feed wheel on both sides of the picture window, a uniform and guided passage of the film is secured.

In the drawing, wherein for the purpose of illustration is shown a preferred embodiment of the invention, 1 is the rear wall, 2 the roll film cassette, 3 the camera casing and 4 the picture window. Above and below the dark chamber 5 (with reference to the narrow section of the camera) toothed wheels 6 are mounted on short axles 6a; these engage in the perforations of the film and feed it from the unwinding chamber to the winding-up chamber. Gear wheels 7 are also mounted on the short axles 6a and gear with the corresponding toothed wheels 9 mounted on the driving axle 8. The axle 8, (as shown in Figures 1 and 2) extends through the space between the unwinding chamber and the dark chamber 5, and is provided at the end which projects through the wall of the camera casing with a turning button 10. Beside the feed wheels 6 there are lever arms 11. Before the film is introduced, these arms are turned upwards (see Figure 4) and are held in this position by action of the spring 12, which arms when folded down hold the inserted film so that its position in respect of the feed wheels 6 is ensured. The correct position of the arms 11 is secured by stops 13.

What I claim is:

1. A camera comprising a casing having end compartments for film cassettes and an exposure opening between said compartments, means for moving a film from one cassette to the other past said exposure opening comprising toothed, rotatable film engaging members disposed on each side of said exposure opening and between said compartments, and means also positioned between said compartments and extending across the camera just outside the exposure opening area for rotating said members.

2. A camera comprising a casing having end compartments for film cassettes and an exposure opening between said compartments, means for moving a film from one cassette to the other past said exposure opening comprising toothed, rotatable film engaging members disposed on each side of said exposure opening and between said compartments, and means also positioned between said compartments and extending across the camera just outside the exposure opening area for rotating said members, and a pivoted film guide member adjacent each of said film engaging members and having an angular extension adapted to overlie an edge of the film adjacent said exposure opening.

LEO GOLDHAMMER.